United States Patent
Nagata

(10) Patent No.: US 6,335,585 B1
(45) Date of Patent: Jan. 1, 2002

(54) CONTROLLER FOR VIBRATION WAVE MOTOR AND IMAGE FORMING APPARATUS

(75) Inventor: Naohisa Nagata, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/404,192

(22) Filed: Sep. 23, 1999

(30) Foreign Application Priority Data

Sep. 28, 1998 (JP) ............................................ 10-274051

(51) Int. Cl.⁷ ................................................ H02N 2/00
(52) U.S. Cl. .................................. 310/316.01; 310/317
(58) Field of Search ........................... 310/317, 316.01, 310/316.02

(56) References Cited

U.S. PATENT DOCUMENTS 4,851,869 A  *  7/1989  Ishimaru et al. ......... 354/195.1
5,585,686 A  * 12/1996  Kataoka ..................... 310/341

FOREIGN PATENT DOCUMENTS

| JP | 58-14682   | 1/1983  | ............ H04N/5/30 |
| JP | 59-204477  | 11/1984 | ............ H02N/11/00 |
| JP | 60-176470  | 9/1985  | ............ H02N/2/00 |
| JP | 63-1379    | 1/1988  | ............ H02N/2/00 |

* cited by examiner

Primary Examiner—Thomas M. Dougherty
(74) Attorney, Agent, or Firm—Fitzpatrick, Cella, Harper & Scinto

(57) ABSTRACT

A controller for controlling a vibration wave motor is provided such that, when the motor is halted in an irregular manner, a drive signal having a frequency insufficient to start rotation of the motor is fed to the motor so as to permit the motor to be manually rotated.

5 Claims, 10 Drawing Sheets

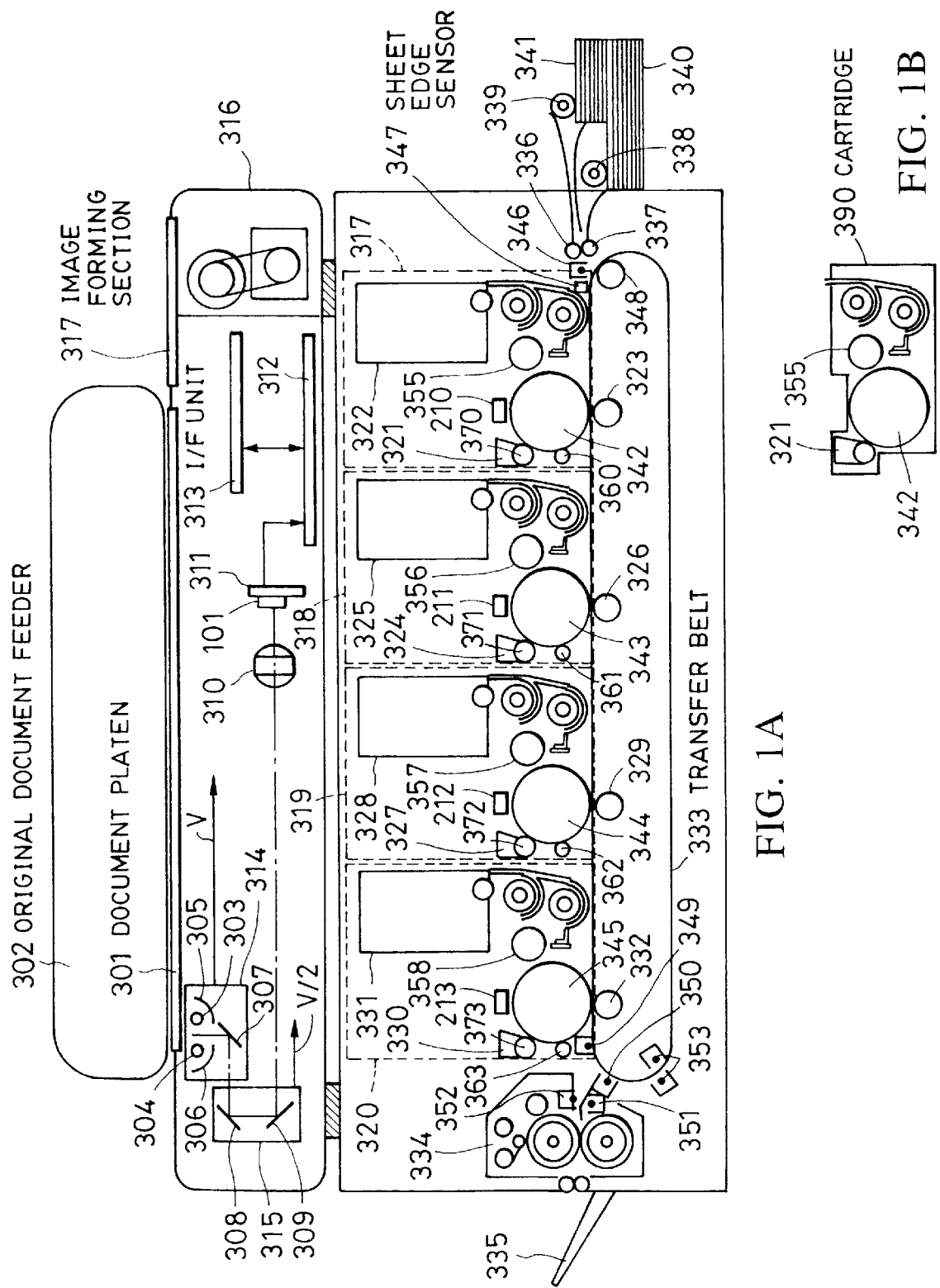
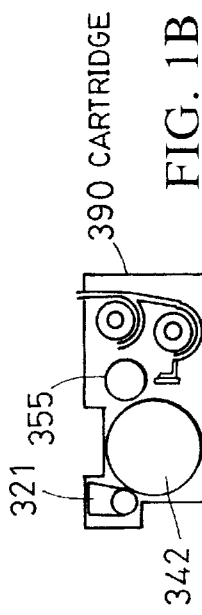
FIG. 1A
FIG. 1B

CONTROLLER FOR VIBRATION WAVE MOTOR AND IMAGE FORMING APPARATUS

BACKGROUND OF THE INVENTION

1. Field of the Invention

The present invention relates to a motor controller for controlling a motor and an image forming apparatus employing the motor controller.

2. Description of the Related Art

Available as a drive power source for a diversity of apparatuses is a motor such as a DC motor, a stepping motor, an AC motor, a vibration wave (ultrasonic) motor, and the like. As disclosed in Japanese Patent Laid-Open No. 58-14682, Japanese Patent Laid-Open No. 63-1379, Japanese Patent Laid-Open No. 60-176470, and Japanese Patent Laid-Open No. 59-204477, a vibration wave motor is composed of an electrical-to-mechanical energy converting vibrator which vibrates in response to a high frequency voltage (drive signal) applied thereto, and a contact member in contact with the vibrator. The contact member is frictionally driven relative to the vibrator by the mechanical vibration energy of the vibrator.

The vibration wave motor features an excellent low-speed rotation reliability, eliminating the need for gear reduction and permitting low noise operation. The vibration wave motor is useful in copying apparatuses and printers, for which low-vibration and low-noise operation is typically required. The vibration wave motor is particularly useful for the precision control of a photoconductive member and a transfer member, which directly affect the image quality in the copying apparatus and the printer.

To control the vibration wave motor in the copying apparatus or the printer, the supplying of a drive signal to the vibration wave motor is started to operate the photoconductive member or the transfer member at the start of a print job, and is halted to stop the operation of the photoconductive member or the transfer member at the end of the print job or at an irregular stop such as the occurrence of a paper jam.

When no drive signal is input to the vibration wave motor, the vibration wave motor stays motionless and cannot be moved. Even if an attempt is made to manually rotate the photoconductive member or the transfer member to remove a residual paper sheet in the apparatus at the occurrence of a paper jam or an error, the vibration wave motor stays motionless, and removal of a residual paper sheet is thus difficult.

Service engineers cannot manually rotate the photoconductive member or the transfer member in the apparatus during maintenance.

SUMMARY OF THE INVENTION

An object of the present invention is to provide a motor controller and an image forming apparatus employing the motor controller, which permit a photoconductive member or a transfer member to be manually rotated while a drive signal is still unable to start the rotation of a halted vibration wave motor.

It is another object of the present invention to provide a motor controller which inputs a drive signal that has characteristics that do not permit a vibration wave motor to rotate on its own subsequent to the event of an irregular stop.

It is yet another object of the present invention to provide a motor controller which inputs a drive signal that has characteristics that selectively do not permit vibration wave motors to rotate on their own.

According to one aspect of the present invention, a controller for controlling a vibration wave motor which applies a frequency signal to an electrical-to-mechanical energy converting element mounted on a vibrator to produce driving power, includes a signal forming circuit for forming the frequency signal, and a mode setting circuit for setting a first mode in which a frequency or voltage required for normal driving is set as the frequency signal, and a second mode in which a frequency or voltage unable to start rotation of the motor but still permitting the motor to be manually rotated is set as the frequency signal.

According to another aspect of the present invention, a controller for controlling a plurality of vibration wave motors, each motor applying a frequency signal to an electrical-to-mechanical energy converting element mounted on a vibrator to produce driving power, includes a signal forming circuit for forming the frequency signal, a mode setting circuit for setting a first mode in which a frequency or voltage required for normal driving is set as the frequency signal, and a second mode in which a frequency or voltage unable to start rotation of the motor but still permitting the motor to be manually rotated is set as the frequency signal, and a selecting circuit for selectively applying the frequency signal in the second mode to the motor.

According to yet another aspect of the present invention, an image forming apparatus employing, as a drive power source, a vibration wave motor which applies a frequency signal to an electrical-to-mechanical energy converting element mounted on a vibrator to produce driving power, includes a signal forming circuit for forming the frequency signal, and a mode setting circuit for setting a first mode in which a frequency or voltage required for normal driving is set as the frequency signal, and a second mode in which a frequency or voltage unable to start the rotation of the motor but still permitting the motor to be manually rotated is set as the frequency signal.

According to yet another aspect of the present invention, an image forming apparatus employing, as drive power sources, a plurality of vibration wave motors, each motor applying a frequency signal to an electrical-to-mechanical energy converting element mounted on a vibrator to produce driving power, includes a signal forming circuit for forming the frequency signal, a mode setting circuit for setting a first mode in which a frequency or voltage required for normal driving is set as the frequency signal, and a second mode in which a frequency or voltage unable to start the rotation of the motor but still permitting the motor to be manually rotated is set as the frequency signal, and a selecting circuit for selectively applying the frequency signal in the second mode to the motor.

These and other objects of the present invention will be apparent from the following discussion of the embodiments.

BRIEF DESCRIPTION OF THE DRAWINGS

FIGS. 1A and 1B show the construction of a color image forming apparatus of a first embodiment of the present invention;

DESCRIPTION OF THE PREFERRED EMBODIMENTS

First Embodiment

Figure 2:
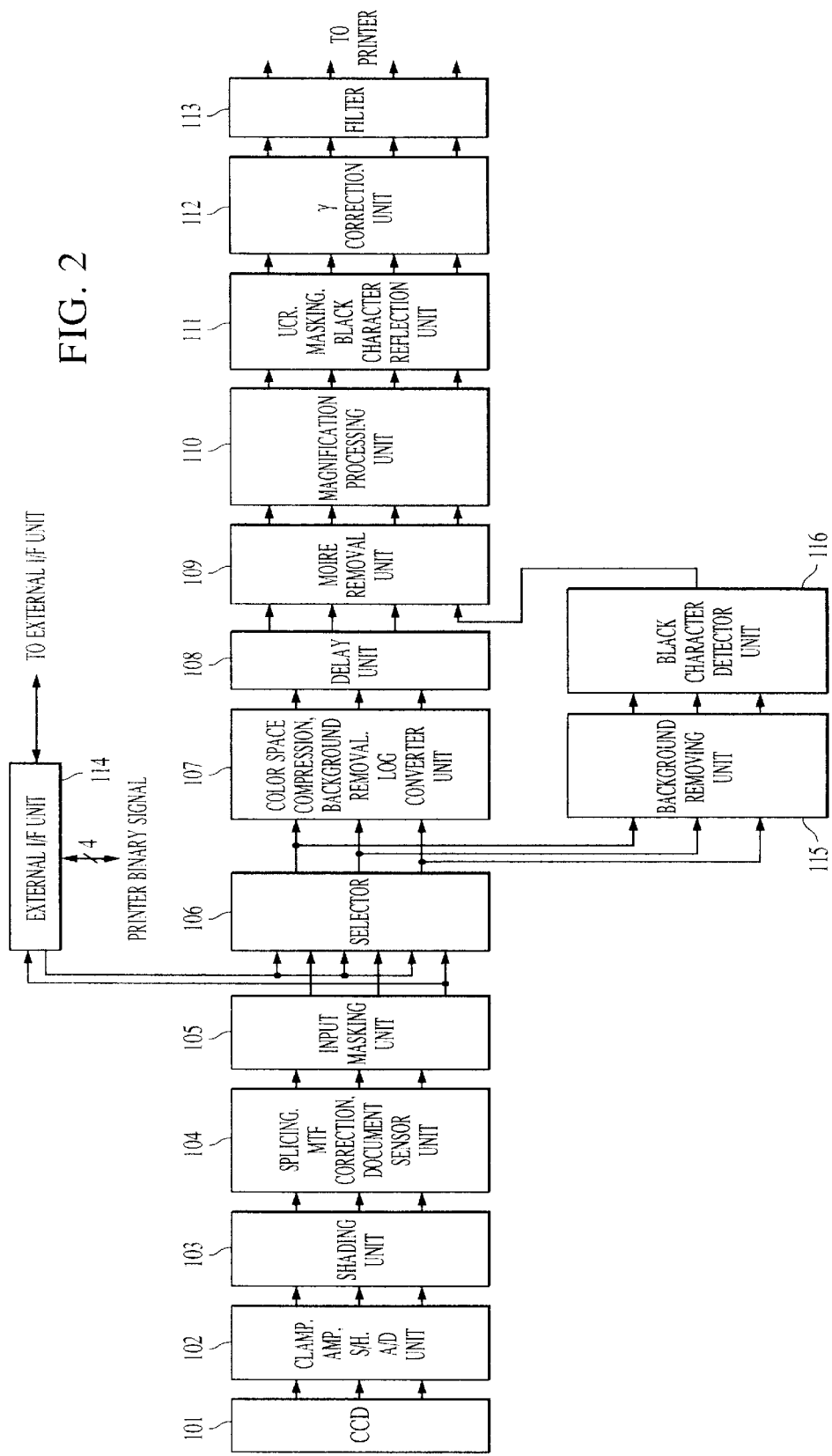
FIG. 2 is a block diagram showing a digital image processing section of the first embodiment shown in FIGS. 1A and 1B.

FIGS. 1A and 1B show the construction of a color image forming apparatus of a first embodiment of the present invention. The color image forming apparatus includes a color image reader and a color printer.

Construction of the Color Image Reader

Referring to FIGS. 1A and 1B, a document glass platen 301 is provided on the top of the color image reader, and an original document feeder (DF) 302 is arranged above the document glass platen 301. Instead of the document feeder 302, a pressure mirror plate (not shown) may be employed. A first carriage 314 includes light sources 303 and 304, which are halogen lamps, reflective mirrors 305 and 306 for condensing and directing light beams from the light sources 303 and 304 onto an original document, and a mirror 307 for reflecting a reflected light beam or a projected light beam from the original document. A second carriage 315 includes mirrors 308 and 309 for condensing the light beam reflected from the mirror 307 onto CCD (Charge-Coupled Device) 101.

CCD101 is mounted on a board 311. The color image reader also includes a video processing unit 312, which is composed of elements other than CCD101 (see FIG. 2), a binarizing unit 201, delay units 202, 203, 204, and 205 (see FIG. 3), and an interface unit 313 for interfacing with other IPUs.

A driving unit 316 mechanically moves the first carriage 314 at a speed of V and the second carriage 315 at a speed of V/2, in a direction perpendicular to the direction of an electrical scanning (main scan) of CD101, to scan the entire surface of the original document (in the direction of sub scan).

FIG. 2 is a block diagram showing the video processing unit 312 in detail.

Referring to FIG. 2, the original document on the document glass platen 301 reflects the light beams from the light sources 303 and 304, and the reflected light beam is then guided to CCD101 to be converted into an electrical signal. When CCD101 is a color image pickup device, RGB color filters may be arranged on a single line CCD in the order of red, green, and blue in an in-line manner. Alternatively, red, green, and blue filters may be respectively arranged on three consecutive lines of CCD. The filters may be of on-chip type and may be arranged separately from the CCD.

The electrical signal (analog video signal) is input to the video processing unit 312. In a clamp, amplifier, S/H and A/D unit 102, the analog video signal is subjected to a sample/hold (S/H) operation, with its dark level clamped to a reference voltage, and is amplified to a predetermined level (the actual order of processing steps heretofore is subject to change), and is analog-to-digital (A/D) converted into eight-bit digital red, green and blue video signals (RGB signals).

The RGB signals are subjected to shading correction and darkness correction in a shading unit 103. In a splicing, MTF (Modulation Transfer Function) correction and document sensor unit 104, a splicing process adjusts signal timing so that reading positions on three lines are aligned by adjusting a delay time for each line in accordance with a reading rate when the reading positions are different from line to line in a three-line type CCD. Since MTF in the reader varies depending on a reading rate and magnification, the MTF correction process corrects the variation. The document sensor recognizes the sheet size of an original document on the original glass platen.

The digital signal, with its reading position aligned, is input to an input masking unit 105. The input masking unit 105 corrects spectroscopic characteristics of CCD101, light sources 303 and 304, and reflective mirrors 305 and 306. The output of the input masking unit 105 is fed to a selector 106, which selects between the output of the input masking unit 105 and a signal from an external interface.

The output of the selector 106 is input to a color space compression, background removal, and logarithmic (LOG) converter unit 107 and a background removing unit 115. The signal, input to the background removing unit 115, is subjected to a background removal process, and is then input to a black character detector unit 116 which determines a black character from among the original document. The black character detector unit 116 produces a black character signal. The color space compression, background removal, and logarithmic converter unit 107, to which the output of the selector 106 is also fed, determines whether the video signal read through color space compression falls within a range reproduceable in the printer. When the video signal falls within the range, no process is performed. When the video signal fails to fall within the range, the video signal is corrected there so that it is reproduceable in the printer. The background removal process is performed, and the RGB signals are then converted into CMY signals through the LOG conversion.

The output of the color space compression, background removal, and logarithmic converter unit 107 is adjusted in its timing through a delay unit 108 to be synchronized with the signal produced in the black character detector unit 116. The signals of the two types are subjected to a moire removal process in a moire removal unit 109, and is then magnified in the main scan direction by a magnification processing unit 110.

In a UCR (Undercolor Removal), masking, black character reflection unit 111, the CMY (cyan, magenta, and yellow) signal, processed by the magnification processing unit 110, is processed into a CMYK (cyan, magenta, yellow and black) signal through UCR process. A masking processing portion in the unit 111 corrects the CMYK signal to be compatible with the printer while a detected signal from the black character detector unit 116 is fed back into the CMYK signal.

The signal, processed by the UCR, masking, black character reflection unit 111, is adjusted in density by a gamma correction unit 112, and is then subjected to a smoothing or edge process through a filter 113.

Figure 3:
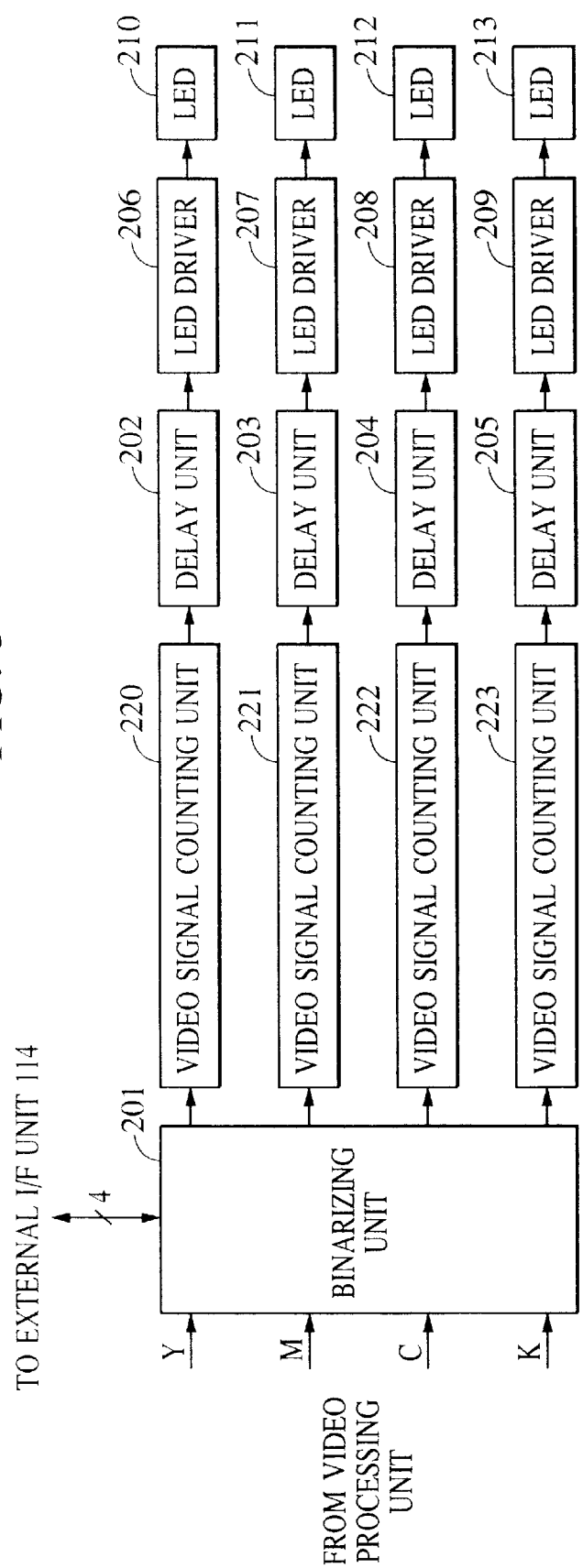
FIG. 3 is a block diagram of an LED drive section of the first embodiment shown in FIG. 1A.

The signal thus produced is converted into a binary signal from a multi-bit, namely, an eight-bit signal by the binarizing unit 201 shown in FIG. 3. The conversion method may be a dither method, an error diffusion method or an improved version of error diffusion method.

Construction of Color Printer

Referring to FIGS. 1A and 1B, a Y (yellow) image forming section 317, an M (magenta) image forming section 318, a C (cyan) image forming section 319, and a K (black) image forming section 320 respectively include photoconductive drums 342, 343, 344, and 345, charging units 321, 324, 327, and 330, LED units 210, 211, 212, and 213, developing units 322, 325, 328, and 331, and auxiliary charging units 360, 361, 362, and 363. The charging units 321, 324, 327, and 330 are respectively provided with charging sleeves 370, 371, 372, and 373, and the developing units 322, 325, 328, and 331 are provided with developing sleeves 335, 356, 357, and 358.

Since the image forming sections are identically constructed, the Y image forming section 317 only is representatively discussed in detail.

The Y image forming section 317 includes the photoconductive drum 342 and, around the photoconductive drum 342, the charging unit 321, the LED unit 210, the developing unit 322, the auxiliary charging unit 360, etc. The photoconductive drum 342, the charging unit 321, and the developing unit 322 are integrated into a unitary cartridge.

The operation of the color printer is now discussed. The auxiliary charging unit 360 and the charging unit 321 charge the photoconductive drum 342. A latent image is formed on the surface of the photoconductive drum 342 in accordance with a light beam from the LED unit 210, and is then developed into a toner image by the developing unit 322.

The developing unit 322 includes the developing sleeve 355, which applies a developing bias for development. As shown in FIG. 1A, a transfer charging unit 323 is arranged below the developing unit 322 with a transfer belt 333 running therebetween. The transfer charging unit 323 performs discharging from behind the transfer belt 333, thereby transferring the toner image from the photoconductive drum 342 to a copy sheet on the transfer belt 333.

The charging unit 321 picks up residual toner remaining on the photoconductive drum 342 to change its electrostatic characteristics, and returns the residual toner back to the photoconductive drum 342. The residual toner is finally collected by the developing unit 322 for recycling.

An image forming process for forming an image on a copy sheet is now discussed. Copy sheets held in a cassette 340 or 341 are picked up by a pickup roller 338 or 339, one by one, and then placed onto a moving transfer belt 333 by paper feed rollers 336 and 337. The transfer belt 333 runs below the Y image forming section 317, M image forming section 318, C image forming section 319, and K image forming section 320, and is driven by a transfer belt roller 348.

The forward edge of the copy sheet, placed onto the transfer belt 333, is detected by a sheet edge sensor 347. The signal, detected by the sheet edge sensor 347, is sent from the printer to the color image reader, and is used as a sub scan synchronization signal when a video signal is fed from the color image reader to the printer.

The copy sheet is then transported by the transfer belt 333, and the toner images are formed on the copy sheet through the image forming sections 317–320 in the order of Y, M, C, and K images.

After passing through the K image forming section 320, the copy sheet is electrically discharged through a discharging and charging unit 349 to facilitate its separation from the transfer belt 333, and is then separated from the transfer belt 333. A peel-off charging unit 350, arranged in the vicinity of the discharging charger unit 349, prevents the image on the copy sheet from being disturbed in the process of discharge taking place in the separation of the copy sheet from the transfer belt 333.

The copy sheet, separated from the transfer belt 333, is charged through pre-fix charging units 351 and 352 to assist the absorption force of the toner and to prevent the disturbance of the image. The toner image is then thermally fused onto the copy sheet, which is then discharged into a discharge tray 335. The transfer belt 333 is then electrically discharged by internal and external discharging units 353.

The controller of the vibration wave motor, in one embodiment of the present invention, is now discussed in detail.

Figure 4:
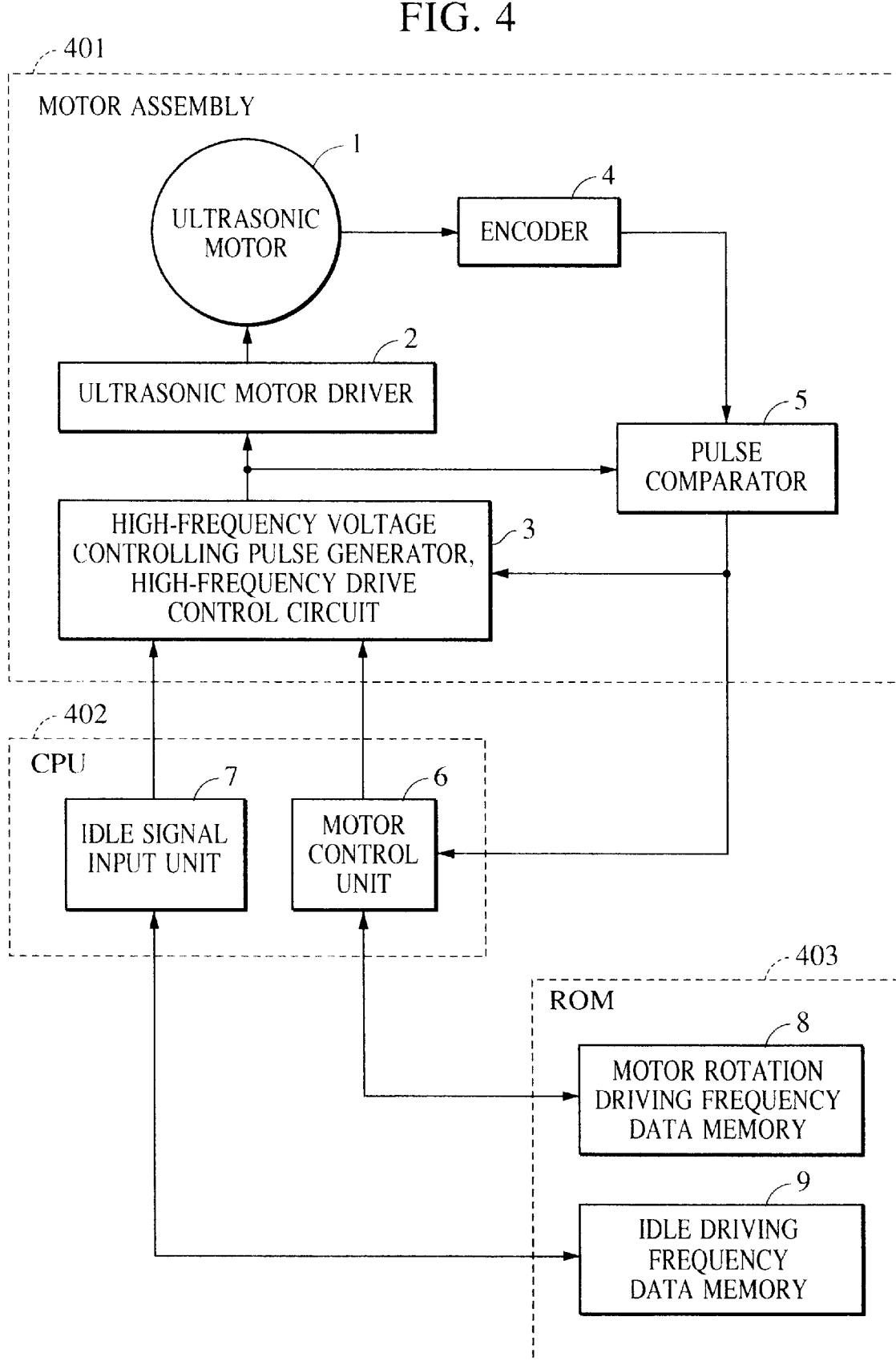
FIG. 4 is a block diagram showing a motor control method in the first embodiment of the present invention.

The photoconductive drums 342, 343, 344, and 345 and the transfer belt 333, shown in FIG. 1A, are separately driven by their own vibration wave motors. FIG. 4 is a block diagram of a controller that controls one of the vibration wave motors.

Referring to FIG. 4, the vibration wave motor controller includes a motor assembly 401, a CPU (Central Processing Unit) 402, and a ROM (Read-Only Memory) 403. Since a vibration wave motor 1 is a known type, which generates driving power by feeding frequency signals having a phase difference to an electrical-to-mechanical energy converting element, namely, a piezoelectric body, mounted on a vibrator, the vibration wave motor 1 is not discussed in detail here. The electrical-to-mechanical energy converting element is supplied with two-phase frequency voltages (with a 90 degree phase difference therebetween) by a motor driver 2. A pulse generator and high-frequency control circuit 3 sends, to the motor driver 2, a pulse signal to set the voltage value and frequency of the frequency voltages. An encoder 4 generates a pulse each predetermined angular rotation of the vibration wave motor 1. A pulse comparator 5 compares the frequency of the pulse signal transmitted to the motor driver 2, to the frequency of the pulse signal output by the encoder 4. A motor control unit 6 is controlled by CPU 402, and an idle signal input unit 7 is also controlled by CPU 402. CPU 402 connects to ROM 403, as storage means for storing data to control the motor. ROM 403 stores data in each of a motor rotation driving frequency data memory area 8 and an idle driving frequency data memory area 9.

When the controller causes the vibration wave motor 1 to rotate, the motor control unit 6 sets rotation driving frequency data from the rotation driving frequency data memory area 8 to the pulse generator and high-frequency control circuit 3. The pulse generator and high-frequency control circuit 3 sends the pulse signal to the motor driver 2, and the motor driver 2 supplies the vibration wave motor 1 with the frequency voltages having the voltage value and frequency determined by the pulse signal. The vibration wave motor 1 thus rotates. The pulse comparator 5 compares the pulse signal from the pulse generator and high-frequency control circuit 3 and the pulse signal that corresponds to the actual rotation of the vibration wave motor 1. The comparison result is sent to the pulse generator and high-frequency control circuit 3, and motor control unit 6 (CPU402) so that feedback control is carried out to assure a predetermined relationship between the both pulse signals. To stop the motor, the motor control unit 6 sends a stop signal to the pulse generator and high-frequency control circuit 3. The frequency voltages the motor driver 2 supplies to the vibration wave motor 1 are cut off, and the vibration wave motor 1 is halted. In its halted state, with no frequency voltages supplied thereto, the vibration wave motor 1 cannot be manually rotated. In the vibration wave motor, the vibrator, as a stator, is frictionally in contact with a movable member, such as a rotor. In operation, a traveling wave is formed on the vibrator, thereby driving the rotor. Because of this principle, the rotor is forced onto the stator in a halt state. A torque required to drive the rotor is large, and thereby the rotor cannot be manually rotated. To allow the motor to be manually rotated, the idle signal input unit 7 sets idle driving frequency data from the idle driving frequency data memory area 9 to the pulse generator and high-frequency control circuit 3 sends a pulse signal to the motor driver 2, and the motor driver 2 supplies the vibration wave motor 1 with the frequency voltages, corresponding to the pulse signal, and at a level insufficient to start rotation of the motor. The vibration wave motor 1 is now manually rotatable.

When a paper jam occurs during a printing operation in the copying apparatus, any unit driven by one of the vibration wave motors may have to be manually rotated to remove a residual sheet, depending on the position of the residual sheet in the apparatus.

The pulse generator and high-frequency control circuit 3 includes an oscillator, such as a VCO (Voltage Controlled Oscillator), for generating a pulse of a frequency in accordance with frequency data set by the idle signal input unit 7 or the motor control unit 6, in CPU 402, and a phase shifter for forming a two-phase pulse by shifting a pulse from the oscillator by 90 degrees. In response to a two-phase pulse, the motor driver 2 applies the frequency voltages corresponding to the two-phase pulse to the electrical-to-mechanical energy converting element. These components have known constructions and are not discussed in detail here.

Figure 5:
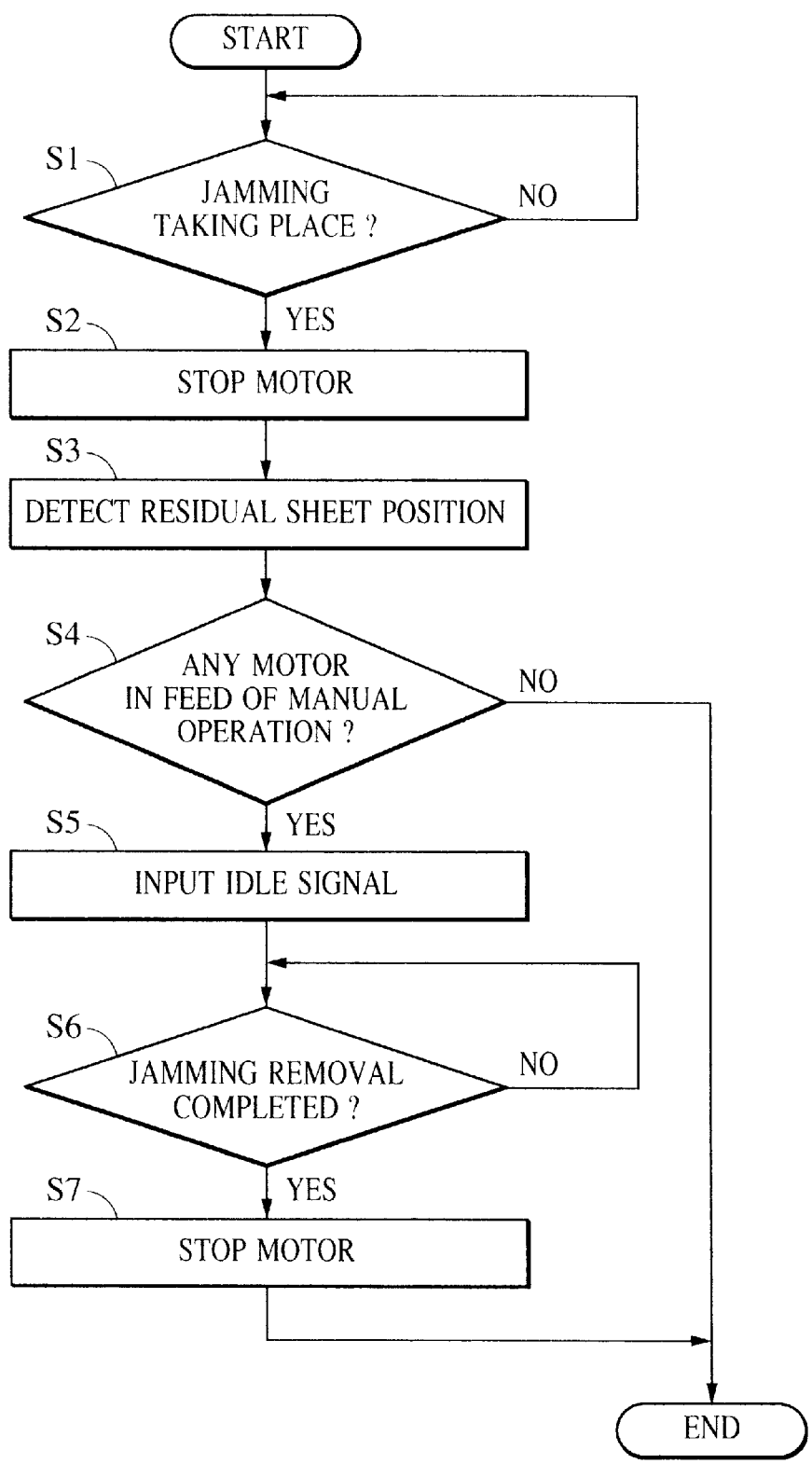
FIG. 5 is a flow diagram showing the motor control method in the first embodiment of the present invention.

FIG. 5 is a flow diagram showing the method of manually rotating the motor.

Referring to FIG. 5, the apparatus monitors sensors along the passageway of copy sheets to check whether a paper jam occurs (step S1). When a paper jam occurs, the motor control unit 6 stops the vibration wave motor 1 (step S2). The apparatus detects the position of a residual sheet in the apparatus (step S3), and determines whether any vibration wave motor 1 needs to be manually rotated (step S4). For example, a sensor is used to determine, in the event of a paper jam, whether the residual copy sheet remains upstream of paper feed rollers 336 and 337. When the residual copy sheet is upstream of the paper feed rollers 336 and 337, the process ends because the transfer belt 333 and the photoconductive drums need not be rotated. When the residual sheet is detected on the transfer belt 333, the transfer belt 333 and the photoconductive drums need to be rotated to remove the residual copy sheet. The idle signal input unit 7 feeds the frequency voltage at a level insufficient to drive the motor but sufficient to permit manual rotation of the motor (step S5). The apparatus checks whether a jam clearing process, namely, a residual sheet removal process is completed (step S6). In the first embodiment, the apparatus detects that its front door is opened, and determines that the jam clearing process is completed when all sensors indicate, at the closing of the front door, that no sheets remain in the apparatus. When the paper jam is cleared, the vibration wave motor 1, under a manually rotatable state by means of the motor control unit 6, is shifted to its halt state (step S7). The process ends.

Second Embodiment

Figure 6:
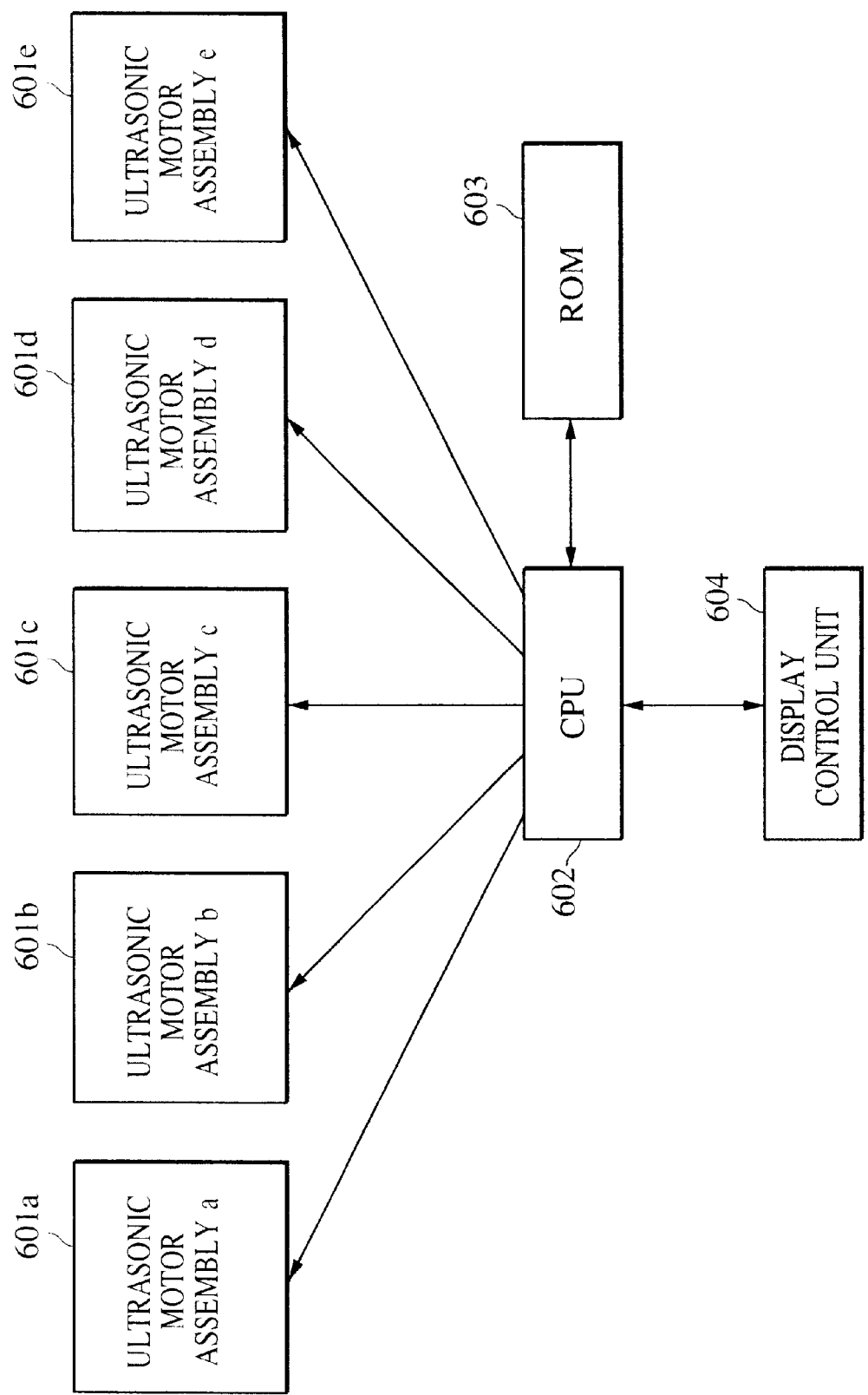
FIG. 6 is a block diagram of a motor control method in accordance with a second embodiment of the present invention.

FIG. 6 is a block diagram showing the operation of a vibration wave motor in accordance with a second embodiment of the present invention.

Referring to FIG. 6, vibration wave motor assemblies 601a, 601b, 601c, 601d, and 601e respectively drive photoconductive drums 342, 343, 344, and 345, and a transfer belt 333. The internal construction of each assembly remains identical to that of the motor assembly 401. CPU602 is, in construction, identical to CPU402 shown in FIG. 4, and permits the vibration wave motor to be rotated, halted and manually rotated. ROM603 store data for controlling the motor, and is identical, in construction, to ROM403 shown in FIG. 4.

Figure 7:
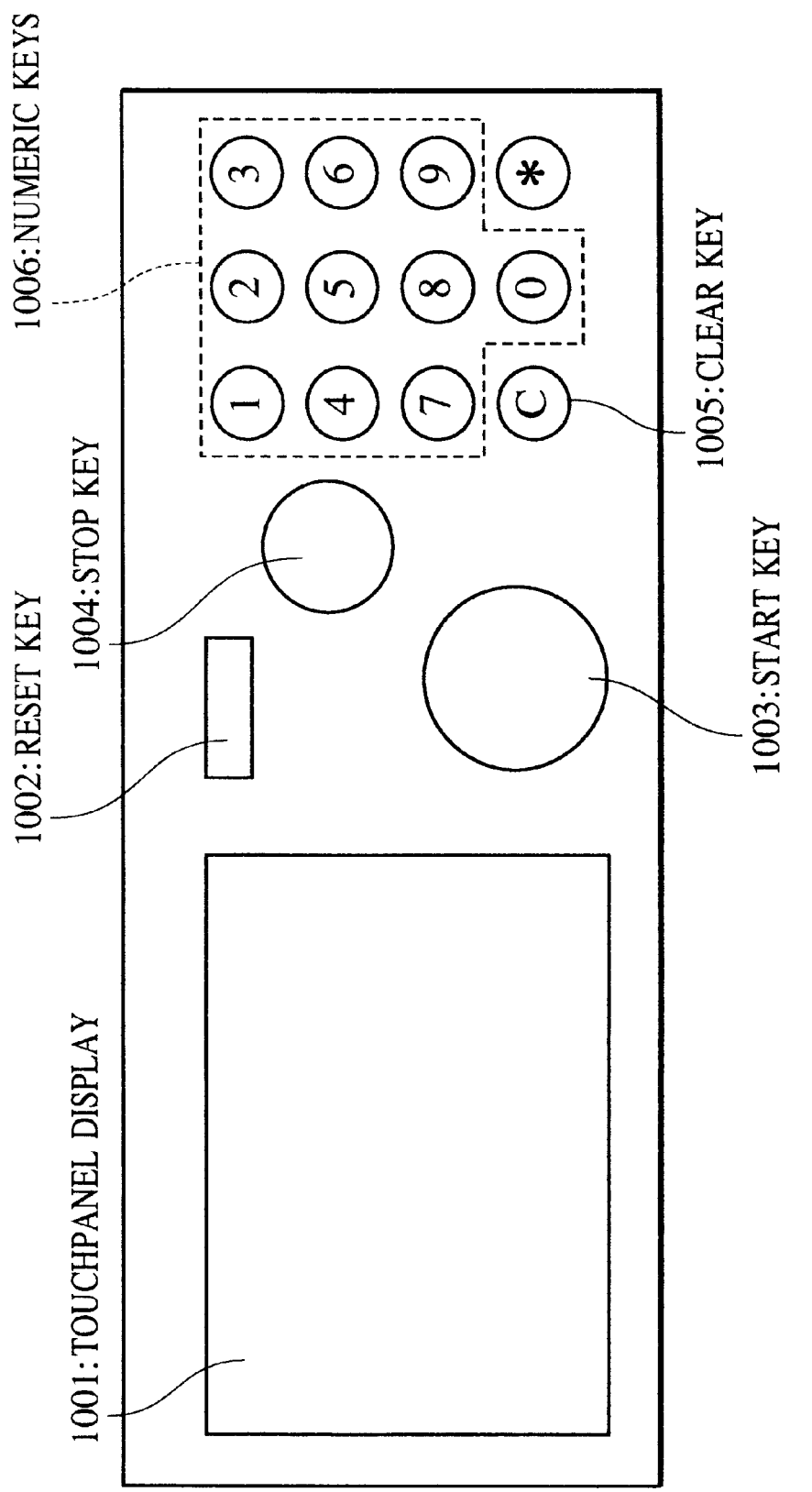
FIG. 7 shows an operation panel in the second embodiment of the present invention.

FIG. 7 shows an operation panel of a display control unit 604 in detail.

Referring to FIG. 7, a touchpanel display 1001 presents the number of copies, a sheet size selected, magnification, and copy density. A reset key 1002 defaults a copy mode back to a standard copy mode. A start key 1003 starts a copying operation. A stop key 1004 suspends a copying operation. A clear key 1005 defaults the copy mode back to the standard copy mode. Numeric keys 1006 set the number of copies. Numeric keys 7, 9 and 2, if concurrently pressed from among the numeric keys 1006, present a service mode display 1010 which the service engineer may refer to in maintenance service.

Figure 8:
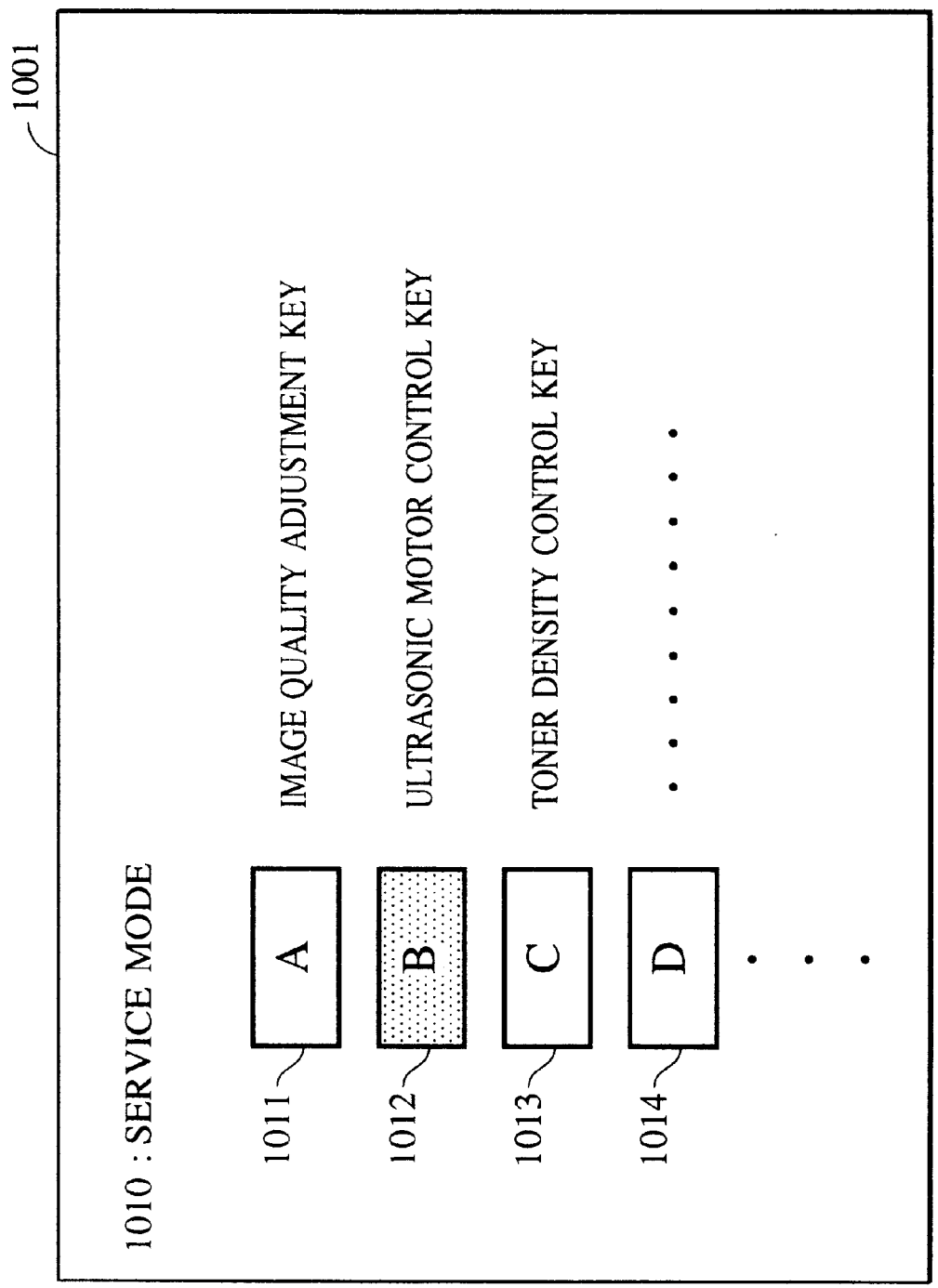
FIG. 8 shows a service mode display in the second embodiment of the present invention.
Figure 9:
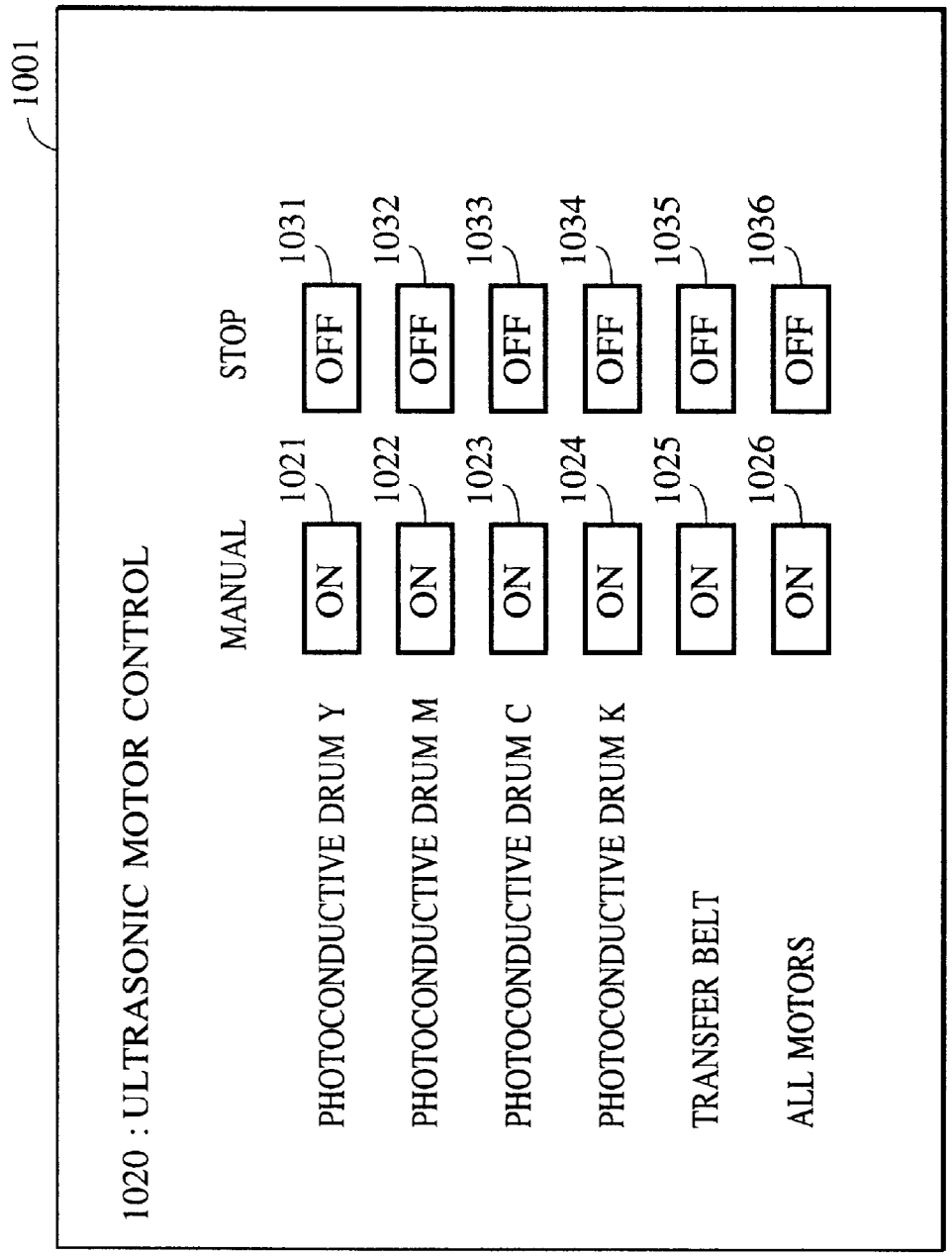
FIG. 9 shows a vibration wave motor control display in the second embodiment of the present invention.

FIG. 8 shows the service mode display 1010, and FIG. 9 shows a vibration wave motor control display 1020.

Referring to FIG. 8 and FIG. 9, the vibration wave motor control display 1020 is presented by pressing a vibration wave motor control key B1012. Each motor is set to the manual operation state or halt state. Referring to FIG. 9, CPU602 sets the idle driving frequency data to permit the corresponding vibration wave motor to be manually rotated when an ON key 1021 or any other ON key is pressed. By pressing an OFF key 1031 or any other OFF key, CPU602 puts the corresponding vibration wave motor to a halt state. By pressing all motor ON key 1026 or all motor OFF key 1036, all vibration wave motors are concurrently set to a manual operation state or halt state.

Figure 10:
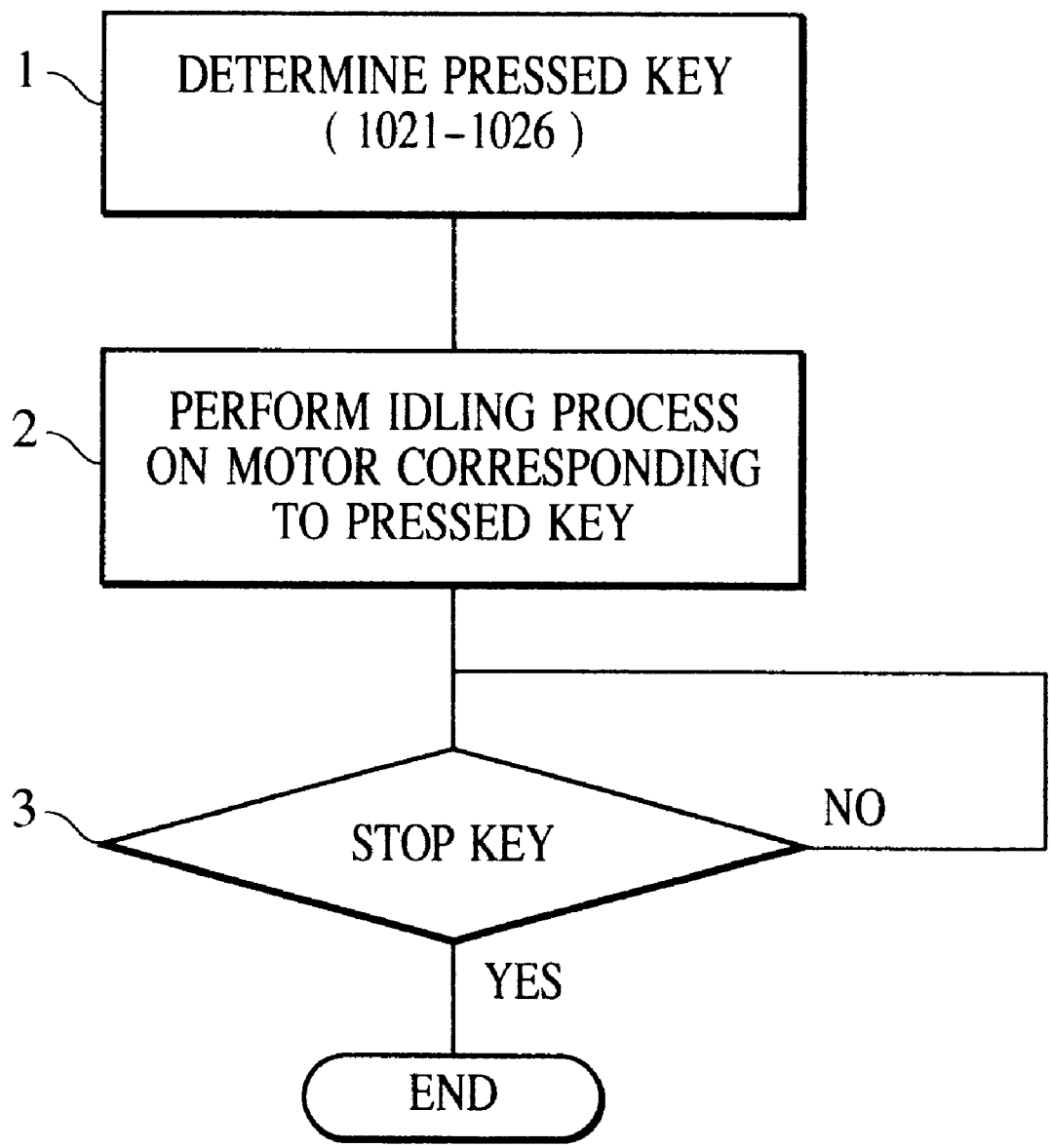
FIG. 10 is a flow diagram showing a process of the service mole.

FIG. 10 is a flow diagram showing the service mode executed by CPU602. In step 1, the apparatus determines which key of 1021 through 1026 is pressed. In step 2, the idle process step in step S5 shown in FIG. 5 is performed on the motor corresponding to the pressed key. In step 3, the supplying of the frequency voltages to the motor, corresponding to a pressed stop key, is stopped.

When the motor remains stationary with the drive signal to the motor cut off in the event of a paper jam or error, the motor is manually rotated by applying a drive signal at a level sufficient to manually rotate but insufficient to normally rotate the motor. This is because the photoconductive drum or the transfer belt need to be rotated to remove a residual sheet in the apparatus. When a service engineer needs to rotate the photoconductive drum or the transfer belt for maintenance purposes on the apparatus, any desired motor is supplied in the service mode with a drive signal at a level sufficient to manually rotate the motor but insufficient to normally rotate the motor, and the motor is thus manually rotatable.

In the above embodiments, the frequency voltage supplied to the motor during the idle operation is at the same frequency as that of the normal drive voltage but is lower in voltage level than the normal driving voltage, at a level sufficiently low that the motor still cannot start rotating on its own. Alternatively, the frequency voltage may be set at the same level as that of the normal drive voltage but higher than a threshold frequency below which the motor starts rotating. Instead of applying two-phase frequency voltages with a frequency difference therebetween during the idle operation, in-phase frequency voltages may be applied or a frequency voltage may be applied in one phase only. It is important that the torque required to start the motor be weakened with the motor still unable to rotate on its own.

What is claimed is:

1. A controller which controls a vibration wave motor, the vibration wave motor including an electrical-to-mechanical energy converting element mounted on a vibrator, said controller applying a driving frequency signal to the electrical-to-mechanical converting element to produce driving power in the vibration wave motor, said controller comprising:

a signal forming circuit which forms the driving frequency signal; and a mode setting circuit that selectively sets said signal forming circuit in a first mode, in which said signal forming circuit generates a driving frequency signal having a frequency and voltage sufficient to normally drive said vibration motor, and, in response to an irregular stop of the vibration wave motor, in a second mode, in which said signal forming circuit generates a driving frequency signal having a frequency or voltage insufficient to start rotation of the vibration wave motor, but sufficient to permit manual rotation of the vibration wave motor.

2. A controller according to claim 1, further comprising a selecting member operable by a user to manually select the second mode.

3. An image forming apparatus comprising:

a vibration wave motor including an electrical-to-mechanical energy converting element mounted on a vibrator, said vibration wave motor generating a driving power when a driving frequency signal is applied to said electrical-to-mechanical energy converting element;

a signal forming circuit which forms a driving frequency signal; and a mode setting circuit that selectively sets said signal forming circuit in a first mode, in which said signal forming circuit generates a driving frequency signal having a frequency and voltage sufficient to normally drive said vibration wave motor, and, in response to an irregular stop of the vibration wave motor, in a second mode, in which said signal forming circuit generates a driving frequency signal having a frequency or voltage insufficient to start rotation of said vibration wave motor, but sufficient to permit manual rotation of said vibration wave motor.

4. An image forming apparatus according to claim 3, wherein said image forming apparatus is a copying apparatus, and wherein the second mode is selected when said vibration wave motor stops in a paper jam state.

5. An image forming apparatus according to claim 4, wherein the driving frequency signal in the second mode is applied in accordance with a position of a paper sheet.

* * * * *

UNITED STATES PATENT AND TRADEMARK OFFICE
CERTIFICATE OF CORRECTION

PATENT NO. : 6,335,585 B1  Page 1 of 1
DATED : January 1, 2002
INVENTOR(S) : Naohisa Nagata It is certified that error appears in the above-identified patent and that said Letters Patent is hereby corrected as shown below:

Drawings,
Sheet 5, Figure 5, "FEED" should read -- NEED --.

Column 3,
Line 11, "mole." should read -- mode. --.

Signed and Sealed this

Twenty-third Day of April, 2002

Attest:

JAMES E. ROGAN
Attesting Officer  Director of the United States Patent and Trademark Office